Figure 1:
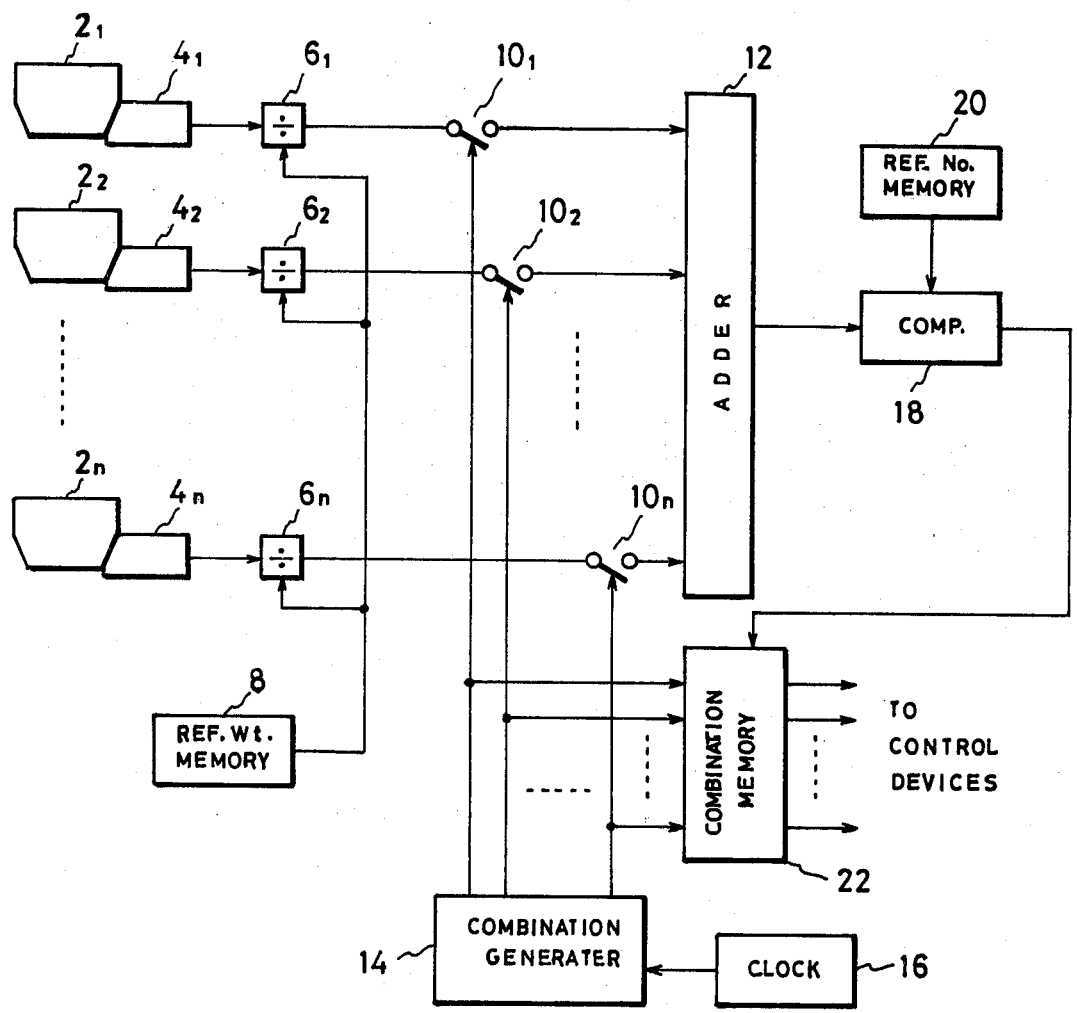

United States Patent [19]

Hirano

[11] 4,398,613

[45] Aug. 16, 1983

[54] DEVICE FOR GROUPING ARTICLES BY COMBINATION SELECTION SO AS TO HAVE THE PREDETERMINED NUMBER

[75] Inventor: Takashi Hirano, Kobe, Japan

[73] Assignee: Yamato Scale Company, Ltd., Hyogo, Japan

[21] Appl. No.: 275,991

[22] Filed: Jun. 22, 1981

[51] Int. Cl.³ .......................................... G01G 19/22
[52] U.S. Cl. ...................................... 177/25; 177/58; 364/567
[58] Field of Search ................. 177/1, 25, 58; 364/567

[56] References Cited

U.S. PATENT DOCUMENTS

| 2,802,658 | 8/1957 | Hensgen et al. | 177/1 |
| 3,708,025 | 1/1973 | Soler et al. | 177/1 |
| 3,939,928 | 2/1976 | Murakami et al. | 177/25 |
| 4,336,853 | 6/1982 | Hirano | 177/25 |

Primary Examiner—George H. Miller, Jr.
Attorney, Agent, or Firm—Eugene E. Geoffrey, Jr.

[57] ABSTRACT

A device for grouping solid articles so as to have a predetermined total number by combination selection technique, in which a plurality of sub-groups of articles are prepared, the number of articles in each sub-group is detected, some of these sub-groups are successively extracted in accordance with a predetermined mathematical combination, the numbers of articles in the extracted sub-groups in each combination are summed to obtain the total number of said combination, the total numbers of the successive combinations are sequentially compared with a predetermined reference number and, when coincidence is obtained between both, the combination of sub-groups is selected to be packed together, so that each pack or bag contains the predetermined number of articles.

3 Claims, 2 Drawing Figures

DEVICE FOR GROUPING ARTICLES BY COMBINATION SELECTION SO AS TO HAVE THE PREDETERMINED NUMBER

This invention relates to a novel and improved device for grouping solid articles so as to have a predetermined total number. The device is especially useful in packing articles, such as cakes and candies, in bags or the like so that each bag contains a predetermined number of articles.

Many types of articles counting devices and machines have been designed and used for the purpose as above. However, most of these prior art systems were used to count the articles one by one and, accordingly, they were time-consuming and inefficient. The disadvantage of the prior art becomes more evident with an increase of the number of articles to be counted off. U.S. Pat. No. 4,267,894 discloses a combination weighing device for grouping articles so as to have a predetermined total weight. This invention has been done by expanding the principle of invention of the above U.S. patent in order to remove the above mentioned disadvantage of the prior art.

According to a feature of this invention, the device includes a plurality of vessels for containing a plurality of solid articles each. Means are provided for detecting the number of articles within each vessel to produce an electric signal indicative of said number and for selectively extracting some of these electric signals successively in accordance with a predetermined set of combinations. The device also includes adder and comparator means for successively summing the extracted combinations of electric signals and producing an output when the number indicated by each of these sums falls within a predetermined number and memory means for storing the combination at the time when this output is applied.

These and other features and objects of this invention will be described in more detail hereinunder with reference to the accompanying drawings.

IN THE DRAWINGS

Figure 2:
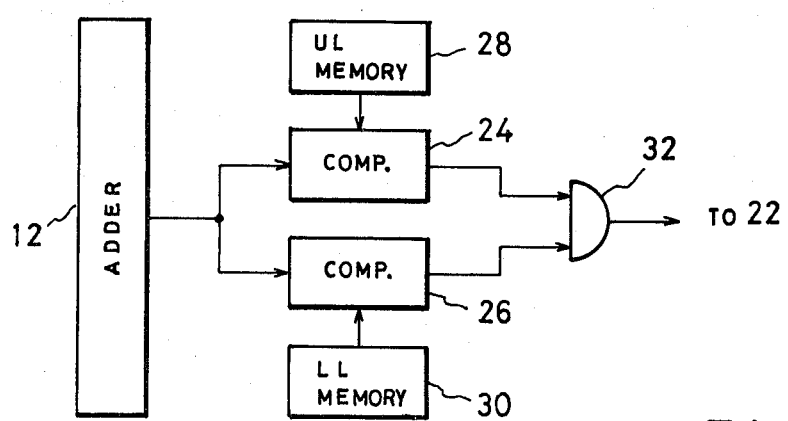

FIG. 1 is a block diagram representing an embodiment of the device according to this invention; and FIG. 2 is a block diagram representing another example of configuration of a part of the arrangement of FIG. 1.

Referring to FIG. 1, this embodiment includes a plurality of weighing balances (not shown) provided with weighing cradles $2_1, 2_2, \ldots 2_n$, respectively, for weighing a plurality of solid articles each. The weighing balances also include weight sensors $4_1, 4_2, \ldots 4_n$, such as load cells, for sensing the weights of articles in the corresponding weighing cradles $2_1, 2_2, \ldots 2_n$ to produce weight indicating signals, respectively. These signals are coupled respectively to inputs of dividers $6_1, 6_2, \ldots 6_n$ the other inputs of which are supplied from a common reference weight memory 8. The memory 8 has an input device such as conventional digital keyboard (not shown) and stores a signal indicative of the predetermined reference weight of a single article, that is, "unit weight". Each divider 6 has a function of dividing the weight indicating signal from the corresponding weight sensor by the reference weight indicating signal from the memory 8 and rounding the result into an integer to obtain the number of articles in the corresponding weighing cradle. In this connection, it will be understood that this embodiment can be used only when the articles are uniform in weight.

The number-indicating output signals from the dividers $6_1, 6_2, \ldots 6_n$ are coupled respectively through normally-open switches $10_1, 10_2, \ldots 10_n$, having a control terminal each, to an adder circuit 12 which sums the inputs to produce an output signal indicative of the total number of articles involved at that time.

The control terminals of the normally-open switches $10_1, 10_2, \ldots 10_n$ are coupled respectively to n-number of output terminals of a combination generator 14. The combination generator 14 is driven by a series of clock pulses from a clock pulse generator 16 to produce a predetermined set of combinations of output signals from its selected output terminals in clocked fashion. For example, if the predetermined set of combinations are complete mathematical combinations of the n-number of outputs, the combination generator 14 may be an n-bit binary counter having a control input coupled to the clock pulse generator 16 and n-number of parallel outputs coupled respectively to the output terminals. In this case, the logic "high" level or binary "1" serves as the "output signal" from each output terminal of the combination generator 14. As widely known by those skilled in the art, the total number of such combinations is $2^n - 1$ and the combination generator 14 produces $(2^n - 1)$ sets of output signals successively in synchronism with the applied clock pulses to close the corresponding ones of normally-open switches 10.

The total number-indicating output signal from the adder circuit 12 is applied to a comparator 18 having another input coupled to a reference number memory 20 which is similar in structure to the reference weight memory 8 and stores a previously predetermined intended total number of articles to be packed in each bag. The comparator 18 compares both inputs and produces an "acceptance" output when both coincide with each other. This output is coupled to a control terminal of a combination memory 22.

The combination memory 22 has a plurality (n-number) of input terminals coupled respectively to the corresponding output terminals of the combination generator 14, and the same number of corresponding output terminals. The combination memory serves to store a set of incoming signals in response to the "acceptance" signal applied to its control input from the comparator 18 and, at the same time, discharge them from the corresponding output terminals, at the end of each combination cycle. Such a combination memory can be designed easily by those skilled in the art and will not be described further. When the packing operation is effected manually, the output signals of the combination memory 22 may be used for actuating lamps for indicating the selected weighing balances. When the device is used with an automatic packing device, the output signals of the combination memory 22 may be used for actuating the unloading and loading gates (not shown) of the corresponding weighing cradles 2.

FIG. 2 shows an alternative example which may be substituted for the judging arrangement consisting of the elements 18 and 20 of FIG. 1. In FIG. 2, the output signal of the adder circuit 12 is applied to a pair of comparators 24 and 26 having second inputs coupled to upper limit (UL) and lower limit (LL) memories 28 and 30, respectively. The memories 28 and 30 are similar in structure to the memory 20 of FIG. 1 and store signals indicative of the upper and lower limits of a predetermined allowable range of the number of articles to be packed in each bag, respectively. The comparator 24 compares both inputs and produces an output when the first input is not greater than the second input, while the comparator 26 compares both inputs and produces an output when the first input is not less than the second input. Thus, if the total number supplied from the adder circuit 12 falls within the allowable range of total number, the outputs of both comparators are supplied at the same time to an AND circuit 32 to cause it to produce an "acceptance" output to be applied to the control input of the combination memory 22.

Another alternative to the judging arrangement described in the afore-cited U.S. patent comprises means for calculating deviation from the reference value and means for storing this deviation and updating it with succeeding lower deviation to provide a combination corresponding to the lowest deviation from the reference number in each cycle of combination.

It will be self-evident from the above description that the outputs of the combination memory 22 can effectively point and specific weighing balances carrying the articles whose total number coincides with a predetermined value or falls within a predetermined range.

In the above embodiment, the number of each subgroup of articles is obtained by weighing the articles and dividing the weight of articles by the unit weight of article. However, the number of articles need not always be obtained by such weighing balances and dividers, but may be obtained also by direct means such as mechanical, optical, electrical or electromagnetic counters which are well known in the art. It should be noted that these and other modifications and changes can be made without leaving the scope of this invention as defined in the appended claims.

What is claimed is:

1. A device for grouping articles by combination selection so as to have a predetermined number, comprising a plurality of vessels each containing a plurality of articles, means for determining the number of said articles in each of said vessels and producing electric signals indicative of said number of articles in each vessel, means for selectively extracting the electric signals successively in accordance with a predetermined set of combinations, adder and comparator means for summing the extracted combinations of signals sequentially and producing an output when the number indicated by each of the sums falls within a predetermined range, and memory means responsive to the output of said adder and comparator means for storing the combination at that time.

2. A device, according to claim 1, wherein said number determining means comprise a plurality of weighing balances having weighing cradles which serve as said vessels, respectively, weight sensors attached to said cradles for producing electric signals indicative of the weight of the articles on each of said cradles, and dividers for dividing said electric signals from said weight sensors by a signal indicative of a predetermined weight to produce signals indicative of the numbers of said articles on each of said cradles.

3. A device for grouping articles by combination selection according to claim 1 wherein said vessels include article loading and unloading means and said device further includes means connecting said memory means to said loading and unloading means for discharging the articles from selected vessels and reloading the last said selected vessels.

* * * * *